United States Patent
Dahake et al.

(10) Patent No.: US 12,458,376 B2
(45) Date of Patent: Nov. 4, 2025

(54) REUSABLE AND ADJUSTABLE SURGICAL JIG SYSTEM FOR MANDIBLE TUMOR RESECTION AND RECONSTRUCTION

(71) Applicants: Sandeep Wasudeorao Dahake, Nagpur (IN); Megha Sanket Kulkarni, New Delhi (IN); Bhushan Dnyaneshwar Tayade, Nagpur (IN); Abhaykumar Madhusudan Kuthe, Nagpur (IN); Sayyad Ammar Sayyad Mushtaque, Buldhana (IN)

(72) Inventors: Sandeep Wasudeorao Dahake, Nagpur (IN); Megha Sanket Kulkarni, New Delhi (IN); Bhushan Dnyaneshwar Tayade, Nagpur (IN); Abhaykumar Madhusudan Kuthe, Nagpur (IN); Sayyad Ammar Sayyad Mushtaque, Buldhana (IN)

( * ) Notice: Subject to any disclaimer, the term of this patent is extended or adjusted under 35 U.S.C. 154(b) by 181 days.

(21) Appl. No.: 18/277,475

(22) PCT Filed: Mar. 4, 2022

(86) PCT No.: PCT/IB2022/051907
§ 371 (c)(1),
(2) Date: Aug. 16, 2023

(87) PCT Pub. No.: WO2022/185261
PCT Pub. Date: Sep. 9, 2022

(65) Prior Publication Data
US 2024/0299046 A1    Sep. 12, 2024

(30) Foreign Application Priority Data
Mar. 5, 2021  (IN) .............. 202121009209

(51) Int. Cl.
*A61B 17/15* (2006.01)
*A61B 17/17* (2006.01)
(Continued)

(52) U.S. Cl.
CPC ............ *A61B 17/176* (2013.01); *A61B 90/08* (2016.02); *A61B 2017/00477* (2013.01);
(Continued)

(58) Field of Classification Search
CPC .... A61B 17/15–17/158; A61B 17/17–17/1796
See application file for complete search history.

(56) References Cited

U.S. PATENT DOCUMENTS

2012/0022604 A1* 1/2012 Polley .................. A61B 17/176
606/86 R
2012/0283737 A1* 11/2012 Machado ............... A61C 1/084
606/96

(Continued)

FOREIGN PATENT DOCUMENTS

WO    2005041785 A1    5/2005
WO    2005112805 A2    12/2005

*Primary Examiner* — Zade Coley
(74) *Attorney, Agent, or Firm* — Christopher Pilling

(57) ABSTRACT

The present disclosure describes a reusable and adjustable surgical jig system (100) for mandible tumor resection and reconstruction. The system 100 comprises base plates (1), L-shaped fixation plate (7), a straight-cut guiding member (10) and an angular-cut guiding member (14). The jig system 100 is formed by connecting plurality of base plates (1) to each other via the mechanical arrangement (6,13) and forming a U-shape structure, adapted for mounting and adjusting the various elements (7, 10, 14) either above or below the base plates (1), as desired for performing mandible tumor resection and reconstruction.

10 Claims, 3 Drawing Sheets

(51) Int. Cl.
*A61B 90/00* (2016.01)
*A61B 17/00* (2006.01)

(52) U.S. Cl.
CPC ............ *A61B 2017/00836* (2013.01); *A61B 2017/0084* (2013.01); *A61B 2017/00938* (2013.01); *A61B 2017/00946* (2013.01); *A61B 2090/0807* (2016.02)

(56) References Cited

U.S. PATENT DOCUMENTS

| | | | |
|---|---|---|---|
| 2016/0235487 A1* | 8/2016 | Davison | A61B 34/20 |
| 2019/0076154 A1* | 3/2019 | Herzog | A61B 17/15 |
| 2020/0015934 A1* | 1/2020 | Llop | A61B 17/176 |
| 2020/0352679 A1* | 11/2020 | Van Rensburg | A61C 1/084 |
| 2020/0352736 A1* | 11/2020 | Van Rensburg | A61C 8/0089 |

* cited by examiner

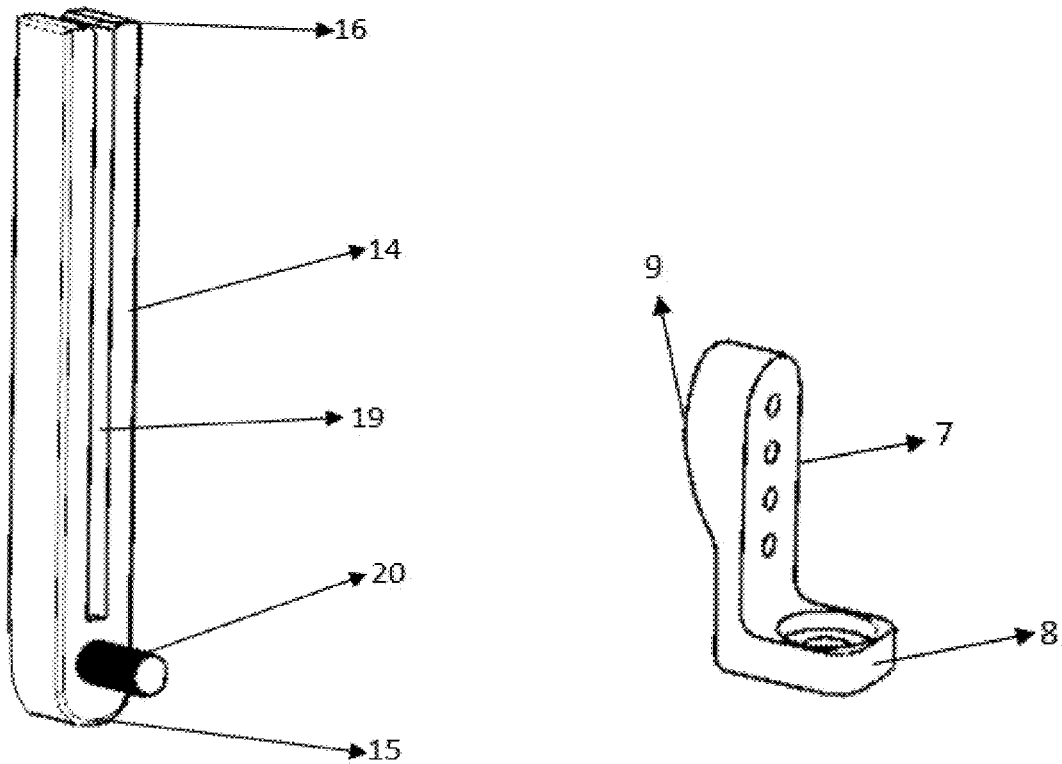
Figure 4
Figure 6
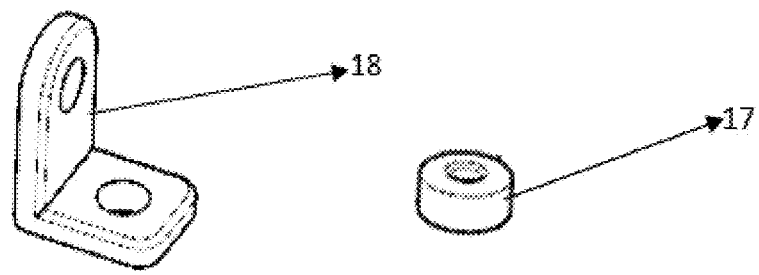
Figure 5

REUSABLE AND ADJUSTABLE SURGICAL JIG SYSTEM FOR MANDIBLE TUMOR RESECTION AND RECONSTRUCTION

CROSS-REFERENCE TO RELATED APPLICATIONS AND PRIORITY

The present application claims priority from Indian Provisional Patent Application number 202121009209, filed on Mar. 5, 2021; and PCT WIPO 2022185261 A1 filed on Mar. 4, 2022, the entire contents of both of which are hereby incorporated by reference in their entirety.

TECHNICAL FIELD

The present invention relates generally to the field of a system/apparatus used for surgical osteotomy procedures. More specifically, the present invention relates to a reusable, low cost, simple and modular jig system.

Still more particularly the present invention relates to a surgical jig system for mandible tumor resection and reconstruction.

BACKGROUND

Background description includes information that may be useful in understanding the present invention. It is not an admission that any of the information provided herein is prior art or relevant to the presently claimed invention, or that any publication specifically or implicitly referenced is prior art.

An osteotomy is a surgical operation whereby a bone is cut to shorten or lengthen or to change its alignment. There are various causes for the osteotomy procedures such as bone deformities, bone realignments, bone fractures, or due to some diseases for e. g. various types of tumour or cancers etc.

Ablative tumor therapy is one of the main important causes for mandibular continuity defects. Reconstruction surgery of continuity defects of mandible is still challenging for craniomaxillofacial (CMF) surgeons. This type of surgery becomes complex and unpredictable because of very limited visibility of closed internal structures, presence of teeth and their relationship with bone, influence of surgery on airway, and interference with occlusion.

Different extended mandibular malignant and benign lesions and inflammation are treated using ablative surgery, which can cause continuity defects in mandible. The stabilization of the resected stumps in the correct anatomical position during the surgical intervention is one of the key features to provide a satisfactory aesthetic appearance and assure an accurate centric occlusion for the restitution of the correct masticatory function, thereby improving the quality of life.

Surgical jigs are the modern progress in implant technology. Guided surgery is becoming the standards in modern medical practice. For transferring a preoperative plan into the actual surgical site precisely, a customized surgical template can serve as a guide to direct the drilling or tumor and bone resection, providing an accurate placement of the bone graft, implant or prosthesis, etc. The jigs have been widely used as an effective solution in various surgical interventions, including oral implantology, cervical or lumbar pedicle screw placement, total knee arthroplasty, treatment of dysplastic hip joint or sacroiliac joint fracture, osteotomy, etc.

Currently, Rapid Prototyping (RP) techniques have been employed widely in maxillofacial surgery. This has tended to concentrate on the reproduction of exact physical replicas of patients' skeletal anatomy which surgeons and prosthetists use to help plan reconstructive surgery and prosthetic rehabilitation. Developments in this area are moving towards exploiting advanced design and fabrication technologies to design and produce implants, surgical guides, patterns or templates that enable the fabrication of custom fitting prostheses without requiring a model of the anatomy to be made.

However, the disadvantages of this procedure are that it requires a patient visit to the clinic for planning, which is time consuming and costly for the patient and clinical staff. The mobility of soft tissue can also lead to inaccuracies when it is used as a planning surface. These inaccuracies can lead to misplacement of the implants which in turn leads to poor aesthetic results. For designing every time surgeon's input is needed, results in increasing the designing time hence minimizes the possibility of use in case of an emergency. Another disadvantage is that, the material used for rapid prototyping of surgical jigs/guides is based on various types of polymers like PLA, ABS, Nylon, Resins etc., which is not a biocompatible material. Thus the surgical jigs/guides are not autoclavable so extra cost is needed for Ethylene oxide sterilization. Now a day's various biocompatible materials are also available for rapid prototyping intensively for medical applications but the cost of these types of materials is very high.

Hence it is inevitable to shift towards new kind of surgical jig which is cost effective, durable, adjustable as per the need, biocompatible and economical and less time consuming.

OBJECTS OF THE PRESENT DISCLOSURE

The main object of present invention is to provide low cost, biocompatible reusable and adjustable surgical jig system for accurate tumor resection and reconstruction surgeries.

Another object of present invention is to provide reusable and adjustable surgical jig system for mandibular tumor resection and reconstruction, which eliminates the need of customization of jig designing as per patient's specifications.

Yet another object of present invention is to provide reusable and adjustable surgical jig system for mandibular tumor resection and reconstruction, which eliminates the need of repetitive visits to surgeon/clinic for designing the customized jig.

Yet another object of present invention is to provide reusable and adjustable surgical jig system for mandibular tumor resection and reconstruction, which is modular, reusable and sterilizable in autoclave.

Yet another object of present invention is to enable usage of the same jig system as it can fit to any patient's mandible for resection of tumor/cancer of any size, shape and at any location, as being adjustable.

Yet another object of present invention is to provide the jig system that provides straight cutting and/or angular cutting of the bone for mandible tumor resection and reconstruction.

SUMMARY

Before the present systems, methods and apparatuses along with components related thereto are described, it is to be understood that this disclosure is not limited to the particular methods, apparatuses, systems and their arrangement as described, as there can be multiple possible embodiments which are not expressly illustrated in the present disclosure but may still be practicable within the scope of the invention. It is also to be understood that the terminology used in the description is for the purpose of describing the particular versions or embodiments only, and is not intended to limit the scope of the present application. This summary is not intended to identify essential features of the subject matter nor it is intended for use in detecting or limiting the scope of the subject matter.

In one embodiment, a reusable and adjustable surgical jig system for accurate resection of tumor and accurate fixation of implant or bone graft is described. The system characterized in that, may comprise plurality of base plates, at least one L-shaped fixation plates, at least one straight-cut guiding member and at least one angular-cut guiding member. The base plate may comprise a measuring scale and a hollow portion/slot along the length of the base plate with a first base end and a second base end. The second base end may be slightly bent/tilted inwardly at an angle ranging from 110°-150° forming a shape of hairpin loop. The hollow portion/slot may enable mounting of the various elements of the system either above or below the base plate as desired. The fixation plate may comprise a flat base portion and elongated portion. The flat base portion may enable connecting at least one fixation element and the elongated portion may enable at least one fixation element at plurality of positions in order to affix the said fixation plate to/near diseased part of mandible for holding the system completely and firmly. The surface of the elongated portion of the fixation plate may protrude outwards at a point in order to accommodate variations in sizes and shapes of diseased part to be resected or mandible contours/surfaces. The straight cut guiding member may comprise a cutting slot and a threaded portion bolt without head. The straight-cut guiding member may enable the blade to perform only straight cuts for resection of diseased part of subject's mandible. The cutting slot may further comprise a close end and open end, enabling entry and exit of the blade though the open end for the cutting. The threaded portion bolt without head may be integrated at the closed end of the straight cut guiding member and may be further connected to the at least one of the base plates via a mechanical arrangement at a position desirable for efficient resection of diseased part. The angular-cut guiding member may comprise a cutting slot and a threaded portion bolt without head. The angular-cut guiding member may further enable the blade to perform angular cuts by setting the guiding member at a predefined angle for resection of diseased part of subject's mandible. The cutting slot of the angular-cut guiding member may enable entry and exit of the blade though the open end for cutting. The threaded portion bolt without head may be further integrated at the closed end of the angular-cut guiding member and may be connected to the at least one of the base plates via the mechanical arrangement and L-shape pin for resecting the diseased part at a predefined angle, ranging from 70-290 degree, as desired.

In another embodiment, a reusable and adjustable surgical jig system for accurate resection of tumor and accurate fixation of implant or bone graft is described. The system characterized in that, may comprise plurality of base plates, at least one L-shaped fixation plates, and either at least one straight-cut guiding member or at least one angular-cut guiding member or a combination thereof. The base plate may comprise a measuring scale and a hollow portion/slot along the length of the base plate with a first base end and a second base end. The second base end may be slightly bent/tilted inwardly at an angle ranging from 110°-150° forming a shape of hairpin loop. The hollow portion/slot may enable mounting of the various elements of the system either above or below the base plate as desired. The fixation plate may comprise a flat base portion and elongated portion. The flat base portion may enable connecting at least one fixation element and the elongated portion may enable at least one fixation element at plurality of positions in order to affix the said fixation plate to/near diseased part of mandible for holding the system completely and firmly. The surface of the elongated portion of the fixation plate may protrude outwards at a point in order to accommodate variations in sizes and shapes of diseased part to be resected or mandible contours/surfaces. The straight cut guiding member may comprise a cutting slot and a threaded portion bolt without head. The straight-cut guiding member may enable the blade to perform only straight cuts for resection of diseased part of subject's mandible. The cutting slot may further comprise a close end and open end, enabling entry and exit of the blade though the open end for the cutting. The threaded portion bolt without head may be integrated at the closed end of the straight cut guiding member and may be further connected to the at least one of the base plates via a mechanical arrangement at a position desirable for efficient resection of diseased part. The angular-cut guiding member may comprise a cutting slot and a threaded portion bolt without head. The angular-cut guiding member may further enable the blade to perform angular cuts by setting the guiding member at a predefined angle for resection of diseased part of subject's mandible. The cutting slot of the angular-cut guiding member may enable entry and exit of the blade though the open end for cutting. The threaded portion bolt without head may be further integrated at the closed end of the angular-cut guiding member and may be connected to the at least one of the base plates via the mechanical arrangement and L-shape pin for resecting the diseased part at a predefined angle, ranging from 70-290 degree, as desired.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

The detailed description is described with reference to the accompanying Figures. In the Figures, the left-most digit(s) of a reference number identifies the Figure in which the reference number first appears. The same numbers are used throughout the drawings to refer like features and components.

FIG. 4 illustrates the perspective view of angular-cut guiding member (14) of the system 100, in accordance to an embodiment of the present disclosure.

FIG. 5 illustrates the perspective view of L-shape pin and bush of the system 100, in accordance to an embodiment of the present disclosure.

FIG. 6 illustrates the perspective view of fixation plate (7) of the system 100, in accordance to an embodiment of the present disclosure.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that, the singular forms "a," "an," and "the" include plural references unless the context clearly dictates otherwise. Although any methods similar or equivalent to those described herein can be used in the practice or testing of embodiments of the present disclosure, the exemplary methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

Figure 1:
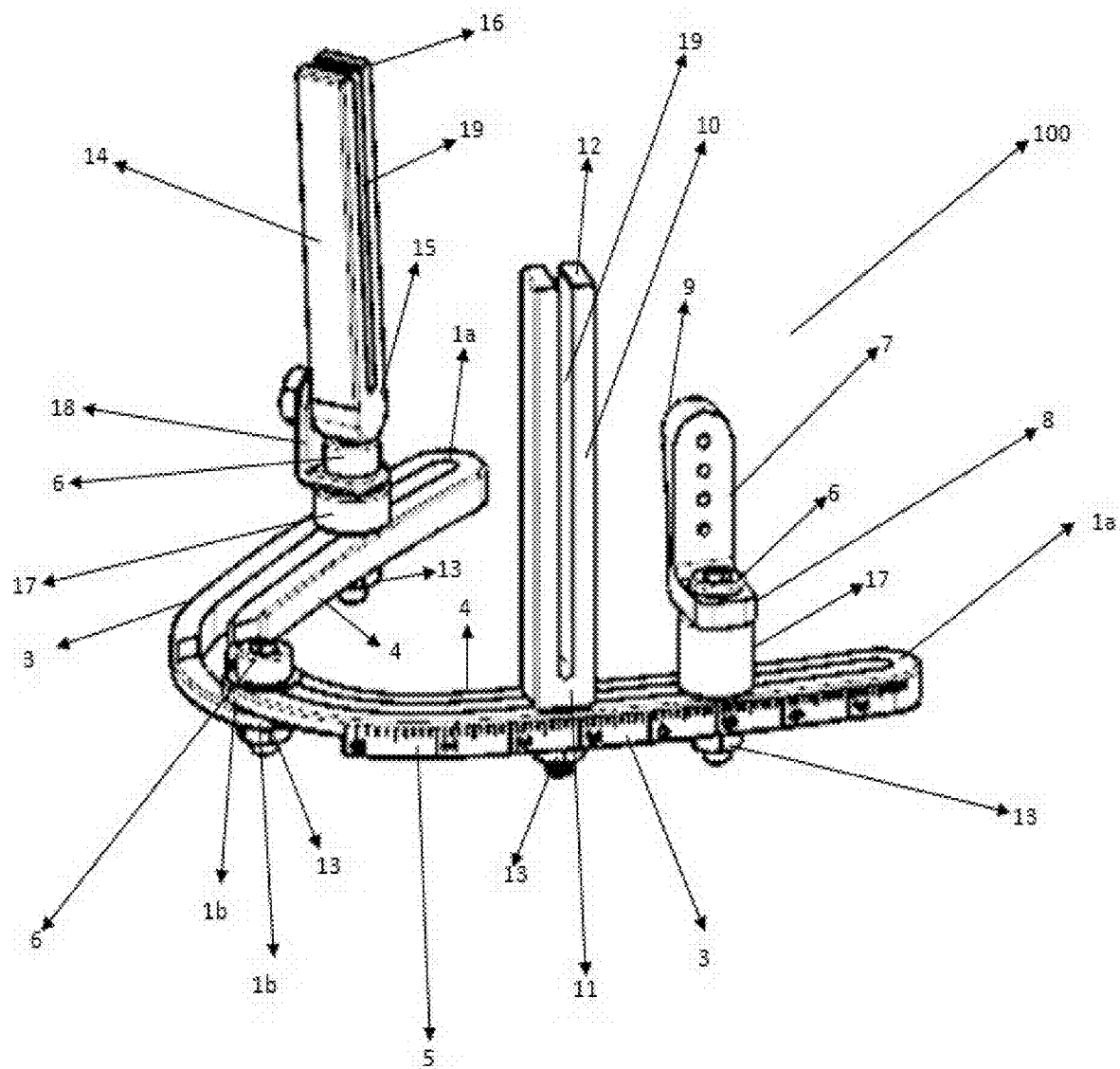
FIG. 1 illustrates a reusable and adjustable jig system 100 for accurate resection of tumor and accurate fixation of implant or bone graft, in accordance to an embodiment of the present disclosure.

The present disclosure relates to a reusable and adjustable surgical jig system for tumor resection and placement of implant/bone graft accurately. The reusable and adjustable surgical jig system enables accurately placing/fixation of implant/bone graft at a desired position with minimal surgeon's time, cost and customization for reusing and sterilizing in autoclave FIG. 1 illustrates a reusable and adjustable jig system 100 for accurate resection of tumor and accurate fixation of implant or bone graft, in accordance to an embodiment of the present disclosure. The jig system 100 may comprise plurality of base plates (1), at least one L-shaped fixation plates (7), at least one straight-cut guiding member (10) and at least one angular-cut guiding member (14). The base plate (1) may comprise a measuring scale (5) and a hollow portion/slot along the length of the base plate (1) with a first base end (1a) and a second base end (1b). The hollow portion/slot may enable mounting of the various elements of the system 100, but not limiting to, such as bolts (6), nuts (13), bushes (17), straight-cut guiding members (10) and angular-cut guiding members (14). The elements (6, 17, 10, 14) of the system 100 may be mounted/connected either above or below the base plate (1) as desired. In one embodiment, the various elements (6, 17, 10, 14) may be placed above the base plate (1). In an exemplary embodiment, some of the elements (6, 17, 10, 14) may be placed above the base plate (1), while some of the elements (6, 17, 10, 14) may be placed below the base plate (1), as desired.

In an embodiment, the system 100 may comprise at least one base plate (1) for supporting other elements of the system 100 and diseased portion of patient to be resected, at least one fixation plate (7) mounted on the base plate (1) with fixation elements (6, 13) adapted to accommodate variations in shapes and sized of diseased portion or mandible contours/surfaces, wherein the fixation plate (7) may be affixed to/near the diseased portion in order to keep the complete surgical jig system 100 in a steady immovable position with respect to the diseased portion. The straight-cut guiding member (10) may be mounted on the base plate (1) via the fixation elements (6, 13) for resecting the diseased portion in straight angle. The angular-cut guiding member (14) may be mounted on the base plate (1) at desired position for resecting the diseased portion at an angle ranging from 70-290 degrees. The angular-cut guiding member (14) may be mounted/affixed to the base plate (1) via bushes (17) and L-shape pin (18) for facilitating the angular motion of angular cutter (14) in a desired direction.

In another embodiment, the jig system 100 may comprise plurality of base plates (1), at least one L-shaped fixation plates (7) and either at least one straight-cut guiding member (10) or at least one angular-cut guiding member (14) or a combination thereof.

Figure 2:
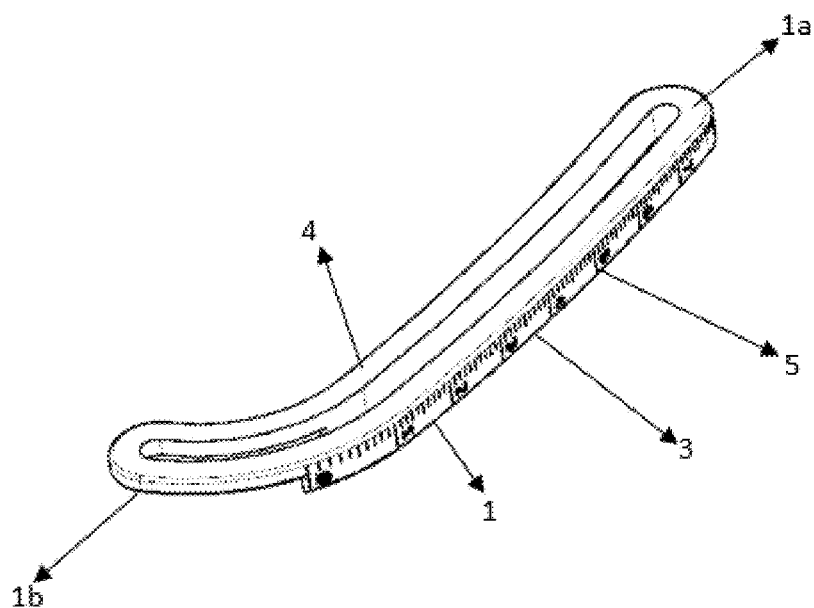
FIG. 2 illustrates the perspective view of base plate (1) of the system 100, in accordance to an embodiment of the present disclosure.

FIG. 2 illustrates the perspective view of the base plate (1) of the system 100, in accordance to an embodiment of the present disclosure. The base plate (1) may be a straight plate, wherein the length of the base plate (1) is in a predefined range of 80 to 110 mm. The base plate (1) may comprise a hollow portion/slot, between front end (3) and back end (4), along the length of the base plate (1) with a first base end (1a) and a second base end (1b). The front end (3) of the base plate (1) may further comprise an engraved measuring scale (5) with millimeter and centimeter markings running through the entire length of the base plate (1). The measuring scale (5) may facilitate the mounting of the various elements of the system 100, (especially straight cutters (10) and angle cutters (14)) and adjust the positions as per requirement). The base plate (1) may bend/tilt inwardly at second ends (1b) at an angle ranging from 110-160 degrees in such a way that it forms a hairpin loop like structure.

During the surgery, the surgeon may use two base plates at a time (either two large base plates, or two small base plates, or one large and one small base plate) as per requirement and size of diseased portion. In such cases, the second base end (1b) of second base plate (1) may be coaxially coupled with second base end (1b) of the first base plate (1) by mechanical arrangement (6, 13) in such a way that it forms a U-shape structure which may be adapted for mounting various elements (7, 10, 14) and holding/supporting the jig system 100.

Figure 3:
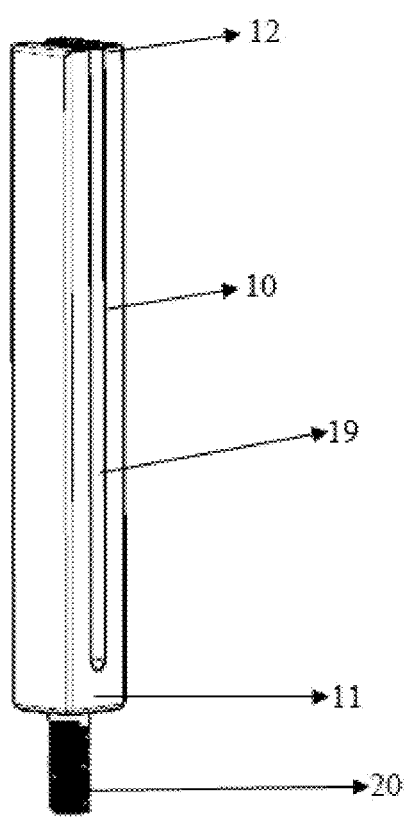
FIG. 3 illustrates the perspective view of straight-cut guiding member (10) of the system 100, in accordance to an embodiment of the present disclosure.

FIG. 3 illustrates the perspective view of straight-cut guiding member (10) of the system 100, in accordance to an embodiment of the present disclosure. The straight-cut guiding member (10) may comprise a cutting slot (19) and a threaded portion bolt without head (20). The straight-cut guiding member (10) may enable the blade (not shown in figures) to perform only straight cuts for resection of diseased part of subject's mandible. The cutting slot (19) may further comprise a close end (11) and open end (12), enabling entry and exit of the blade though the open end for the cutting. In one embodiment, the width of the cutting slot (19) may be in a predefined range of 1.5 to 2 mm through which a cutting blade may be inserted and perform the straight cut either on one side of the diseased portion or both sides of the diseased portion as per requirement.

The threaded portion bolt without head (20) may be integrated at the closed end (11) of the straight cut guiding member (10) and may be further connected to the at least one of the base plates (1) via a mechanical arrangement (6, 13) at a position desirable for efficient/required resection of the diseased part.

In one embodiment, the length of the straight-cut guiding member (10) may be in a predefined range of 58 to 72 mm. In an exemplary embodiment, the straight-cut guiding members (10) of specific lengths may be selected as per the requirement for implant/bone graft fixation.

FIG. 4 illustrates the perspective view of angular-cut guiding member (14) of the system 100, in accordance to an embodiment of the present disclosure. The angular-cut guiding member (14) may comprise a cutting slot (19) and a threaded portion bolt without head (20). The angular-cut guiding member (14) may further enable the blade (not shown in figures) to perform angular cuts by setting the guiding member (14) at a predefined angle for resection of diseased part of subject's mandible. The cutting slot (19) of the angular-cut guiding member (14) may enable entry of the blade though the open end (16) for cutting. The threaded portion bolt without head (20) may be further integrated at the closed end (15) of the angular-cut guiding member (14) and may be connected to the at least one of the base plates (1) via the mechanical arrangement (6, 13) and L-shape pin (18) for resecting the diseased part. In one embodiment, the bolt without head (20) may be attached at the front side of the angular-cut guiding member (14 through which said angular cutter (14) is mounted on L-shape pin (18) via a nut (13). The L-shape pin (18) may be further affixed/connected to at least one base plate (1) with the help of bolts (6) and nuts (13) as shown in FIG. 1.

In an embodiment, the angular-cut guiding member (14) may enable the cutting at angle in a predefined range of 70-290 degrees of the diseased portion. The angular-cut guiding member (14) may move freely from an angle 70 degree to 290 degrees in order to perform an accurate angular cut of diseased portion. In yet another embodiment, the length of the angular-cut guiding member (14) may be in a predefined range of 52 mm to 62 mm and may use as per requirement.

FIG. 5 illustrates the perspective view of L-shape pin and bush of the system 100, in accordance to an embodiment of the present disclosure. In one embodiment, The L-shape pin (18) may provide free movement in a required angle to the angular-cut guiding member (14) and assists in fixing/adjusting the angular-cut guiding member (14) with respect to the base plate (1) through the mechanical arrangement of bolts (6), nuts (13) and bushes (17). In an embodiment, the L-shape pin (18) may further enable angle rotation movement of the angular-cut guiding member (14).

In an embodiment, the height of the bush may vary in a predefined range from 5 mm to 20 mm. The diameter of the bush may be 11 mm. The height of the bush may further enable either to increase/decrease the height of the angular-cut guiding member (14) as per requirement or to increase/decrease the height of system (100) from the fixation plate (7) with one or more fixation elements (6, 13) as per requirement.

FIG. 6 illustrates the perspective view of fixation plate (7) of the system 100, in accordance to an embodiment of the present disclosure. In an embodiment, the fixation plate may comprise a flat base portion (8) and elongated portion (9). The flat base portion (8) may enable connecting at least one fixation element (6, 13) and the elongated portion (9) may enable at least one fixation element at plurality of positions in order to affix the fixation plate (7) to diseased part of mandible for holding the system completely and firmly with respect to the diseased portion. The base portion (8) may be either adapted to affix either directly to the base plate (1) in parallel plane, or with nuts (6) and bolts (13), or bush (17), or any combination thereof.

In an embodiment, the elongated portion (9) may be perpendicular to said base portion (8). The elongated portion (9) of the fixation plate (7) may comprise variable outer diameter along the length of elongated portion (9) in order to accommodate variety of shapes and/or sizes of the diseased part or mandible contours/surfaces for resection. It can be said that, the surface of the elongated portion (9) of the fixation plate (7) may protrude outwards at a point in order to accommodate variations in sizes and shapes of diseased part/portion to be resected. In yet another embodiment, the outer diameter of the elongated portion (9) may vary throughout the entire length of elongated portion.

Furthermore, the system 100 is completely adjustable and reusable by sterilizing in autoclave similar to other surgical instruments, and hence the system 100 minimizes the surgeon visits and eventually the cost for customized and non-reusable jigs devices. The system 100 may be manufactured using the materials like, but not limited to, stainless steel, titanium, cobalt, chromium, Poly Ether Ether Ketone (PEEK) or any combination thereof.

In yet another embodiment, the surgical jig system 100 may provide efficient resection and/or accuracy in implant/bone graft placement/fixation as per the requirements.

In yet another embodiment, the method for guiding the mandible tumor resection by utilizing a surgical jig 100 is described. The method may comprise a step of selecting a two base plates (1) of variable length as per the requirement and connecting the base plates (1) via mechanical elements (6, 13) after mounting of the fixation plate (7) is carried out. The method may comprise a step of selecting a fixation plate (7) of a desired length and affixing the fixation plate (7) to/near the diseased portion on a rapid prototyping (RP) assisted diseased model, as per the space available near one of the guiding members (10, 14) either on one side or both sides in order to achieve more sturdy fixation. The rapid prototyping (RP) assisted diseased model may be created by referring the X-ray/CT scan image of the mandible area of the patient. The fixation plate (7) may be mounted by the surgeon on the rapid prototyping (RP) assisted diseased model, which further assists in mounting the connected base plates (1). The base plates (1) may be affixed with the fixation plate (7) and positioned either over or below the the fixation plate (7), as desired for the surgery. The fixation plate (7) and the base plates (1) may be affixed either via nuts (6) and bolts (13), or bush (17), or any combination thereof. The method may comprise a step of adjusting the base plates (1) as per the shape of diseased portion and tighten the nut (13) in order to restrict the movement of the base plates (1), followed by fixing/adjusting the guiding members (10, 14) at desired positions via the mechanical elements (6, 13). The method may comprise a step of removing the system 100 from the RP assisted diseased portion, by loosening the screws of the fixation plate (7) and without disturbing the position of the guiding members (10, 14), in order to sterilize the complete assembly using an autoclave. The method may comprise a step of fixing/placing the sterilized assembly directly at the required/actual surgery site by the surgeon, with the same positions of the guiding members (10, 14) as placed over the RP assisted diseased model) the system 100. Further, the surgeon may cross check the position of the guiding members (10, 14) with the available scale (5) present on the base plate (1). After confirmation of the position of the guiding members (10, 14), the surgeon may perform the resection of the tumor via the guiding members (10, 14). After the tumor cutting/resection is completed, the surgeon may loosen the fixation plate screws/bolts/nuts, remove the complete jig system 100 from the mandible area of patient, dissemble the all elements (7, 10, 14) of the jig system 100 and, followed by washing and sterilizing the jig system 100 properly for its next use. In an embodiment, the surgeon may perform the mandible reconstruction by fixing of an implant or bone graft, enabling the jig system 100 to be present in the mandible area of the patient, followed by loosening of the fixation plate screws/bolts/nuts, removing the complete jig system 100 from the mandible area of patient, dissembling the all elements (7, 10, 14) of the jig system 100 and, followed by washing and sterilizing the jig system 100 properly for its next use.

Hence, a smart, reusable, autoclavable, modular surgical jig system for tumor resection and implant positioning/fixation of provides an alternative to customized and non-reusable surgical jig which is cost effective, easy to operate, eliminating the need of frequent visits to surgeon and customized designing as per patient specifications.

In accordance with embodiments of the present disclosure, the reusable and adjustable adjustable jig system 100 for accurate resection of tumor and accurate fixation of implant or bone graft, described above may have following advantages including but not limited to:

Reusable—Can be used for multiple patients after sterilization

Adjustable—can be used for any shape and size of tumor

High strength due to manufacturing in metal

Can be used to resect tumor available on any location of mandible

Can be used in emergency cases

Cost effective—no separate designing of the jig system is required.

Intraoperative adjustment is possible

Easily autoclavable

Mounting of all members can be above or below the base plate.

Ease of installation—Only fixation plate is attached to the mandible.

Intraoperative adjustment is also possible.

Height adjustment of the jig system and/or the cutting members is possible by inserting/adding bushes.

The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

REFERENCE NUMERALS IN THE FIGURES

| Legend | Description |
| --- | --- |
| 100 | Complete system of present invention |
| 1 | Base plate |
| 1a | First base end of base plate |
| 1b | Second base end of base plate |
| 3 | Front end of base plate |
| 4 | Back end of base plate |
| 5 | Measuring scale |
| 6 | Bolts |
| 7 | Fixation plate |
| 8 | Base portion of fixation plate |
| 9 | Elongated portion of fixation plate |
| 10 | Straight-cut guiding member |
| 11 | Close end of straight-cut guiding member |
| 12 | Open end of straight-cut guiding member |
| 13 | Nuts |
| 14 | Angular-cut guiding member |
| 15 | Close end of angular-cut guiding member |
| 16 | Open end of angular-cut guiding member |
| 17 | Bush(es) |
| 18 | L-shape Pin |
| 19 | Cutting slot |
| 20 | Bolt without head |

What is claimed is:

1. A reusable and adjustable surgical jig system for a mandible tumor resection and reconstruction, the system, comprising:
   a plurality of base plates;
   an L-shaped fixation plate;
   a straight-cut guiding member; and
   an angular-cut guiding member;
      wherein each base plate of the plurality of base plates comprises a measuring scale and a slot along a length of the base plate with a first base end and a second base end, wherein the second base end is bent at an angle ranging from 110-150 degrees with respect to the first base end, forming a shape of a hairpin loop, wherein the slot enables mounting of the L-shaped fixation plate, the straight-cut guiding member, and the angular-cut guiding member either above or below a base plate of the plurality of base plates;
      wherein the L-shaped fixation plate, comprises a flat base portion and an elongated portion, wherein the flat base portion is adapted to accommodate at least one fixation element and the elongated portion is adapted to accommodate the at least one fixation element at a plurality of positions in order to affix the L-shaped fixation plate to a diseased part of a subject's mandible for holding the system completely and firmly, wherein a surface of the elongated portion protrudes outwards at a point in order to accommodate variations in sizes and shapes of the diseased part to be resected;
      wherein the straight-cut guiding member comprises a first cutting slot and a first bolt without a head, wherein the straight-cut guiding member enables a blade to perform only straight cuts for the resection of diseased part of the subject's mandible, wherein the first cutting slot of the straight-cut guiding member comprises a first closed end and a first open end, enabling entry and exit of the blade though the first open end for cutting, wherein the first bolt without the head of the straight-cut guiding member is integrated at the first closed end of the straight-cut guiding member and is further connected to a base plate of the plurality of the base plates via a mechanical arrangement at a position desirable for efficient resection of the diseased part;
      wherein the angular-cut guiding member comprises a second cutting slot and a second bolt without a head, wherein the angular-cut guiding member enables the blade to perform angular cuts by setting the angular-cut guiding member at a predefined angle for the resection of the diseased part of subject's mandible, wherein the second cutting slot of the angular-cut guiding member enables entry and exit of the blade though a second open end for cutting, wherein the second bolt without the head of the angular-cut guiding member is integrated at a second closed end of the angular-cut guiding member and is further connected to a base plate of the plurality of base plates via the mechanical arrangement and an L-shape pin for resecting the diseased part at a predefined angle ranging from 70-290 degrees;

wherein the system forms a U-shape structure by connecting the plurality of base plates to each other via the mechanical arrangement, adapted for mounting and adjusting the L-shaped fixation plate, the straight-cut guiding member, and the angular-cut guiding member as desired by a surgeon for performing the mandible tumor resection and reconstruction.

2. The jig system as claimed in claim 1, wherein the measuring scale is engraved at a front side of a base plate of the plurality of base plates.

3. The jig system as claimed in claim 1, wherein a base plate of the plurality of base plates has a length in a predefined range of 80-110 mm.

4. The jig system as claimed in claim 1, wherein the mechanical arrangement comprises a nut and a bolt.

5. The jig system as claimed in claim 4, wherein the mechanical arrangement enables fixing and adjusting the L-shaped fixation plate, the straight-cut guiding member, and the angular-cut guiding member with respect to a base plate of the plurality of base plates.

6. The jig system as claimed in claim 1, wherein the L-shaped fixation plate comprises a variable outer diameter along a length of the elongated portion in order to accommodate a variety of shapes and sizes of the diseased part for the resection of the subject's mandible.

7. The jig system as claimed in claim 1, comprises bushings for altering a height of the angular-cut guiding member.

8. The jig system as claimed in claim 1, comprises bushings for altering a height of the jig system through the L-shaped fixation plate.

9. The jig system as claimed in claim 1, wherein the jig system is comprised of a material selected from stainless steel, titanium, cobalt, chromium, and Poly Ether Ether Ketone (PEEK).

10. A reusable and adjustable surgical jig system for a mandible tumor resection and reconstruction, the system comprising:
a plurality of base plates;
an L-shaped fixation plate; and
either a straight-cut guiding member or an angular-cut guiding member or both;
wherein each base plate of the plurality of base plates comprises a measuring scale and a slot along a length of the base plate with a first base end and a second base end, wherein the second base end is bent at an angle ranging from 110-150 degrees with respect to the first base end, forming a shape of a hairpin loop, wherein the slot enables mounting of the L-shaped fixation plate, the straight-cut guiding member, and the angular-cut guiding member either above or below a base plate of the plurality of base plates;

wherein the L-shaped fixation plate, comprises a flat base portion and an elongated portion, wherein the flat base portion is adapted to accommodate at least one fixation element and the elongated portion is adapted to accommodate the at least one fixation element at a plurality of positions in order to affix the L-shaped fixation plate to a diseased part of a subject's mandible for holding the system completely and firmly, wherein a surface of the elongated portion protrudes outwards at a point in order to accommodate variations in sizes and shapes of the diseased part to be resected;

wherein the straight-cut guiding member comprises a first cutting slot and a first bolt without a head, wherein the straight-cut guiding member enables a blade to perform only straight cuts for the resection of diseased part of the subject's mandible, wherein the first cutting slot of the straight-cut guiding member comprises a first closed end and a first open end, enabling entry and exit of the blade though the first open end for cutting, wherein the first bolt without the head of the straight-cut guiding member is integrated at the first closed end of the straight-cut guiding member and is further connected to a base plate of the plurality of the base plates via a mechanical arrangement at a position desirable for efficient resection of the diseased part;

wherein the angular-cut guiding member comprises a second cutting slot and a second bolt without a head, wherein the angular-cut guiding member enables the blade to perform angular cuts by setting the angular-cut guiding member at a predefined angle for the resection of the diseased part of subject's mandible, wherein the second cutting slot of the angular-cut guiding member enables entry and exit of the blade though a second open end for cutting, wherein the second bolt without the head of the angular-cut guiding member is integrated at a second closed end of the angular-cut guiding member and is further connected to a base plate of the plurality of base plates via the mechanical arrangement and an L-shape pin for resecting the diseased part at a predefined angle ranging from 70-290 degrees;

wherein the system forms a U-shape structure by connecting the plurality of base plates to each other via the mechanical arrangement, adapted for mounting and adjusting the L-shaped fixation plate, the straight-cut guiding member, and the angular-cut guiding member as desired by a surgeon for performing the mandible tumor resection and reconstruction.

* * * * *